Dec. 17, 1946.                W. C. FULTON                 2,412,881
                              CONTROL SYSTEM
                            Filed Sept. 14, 1944
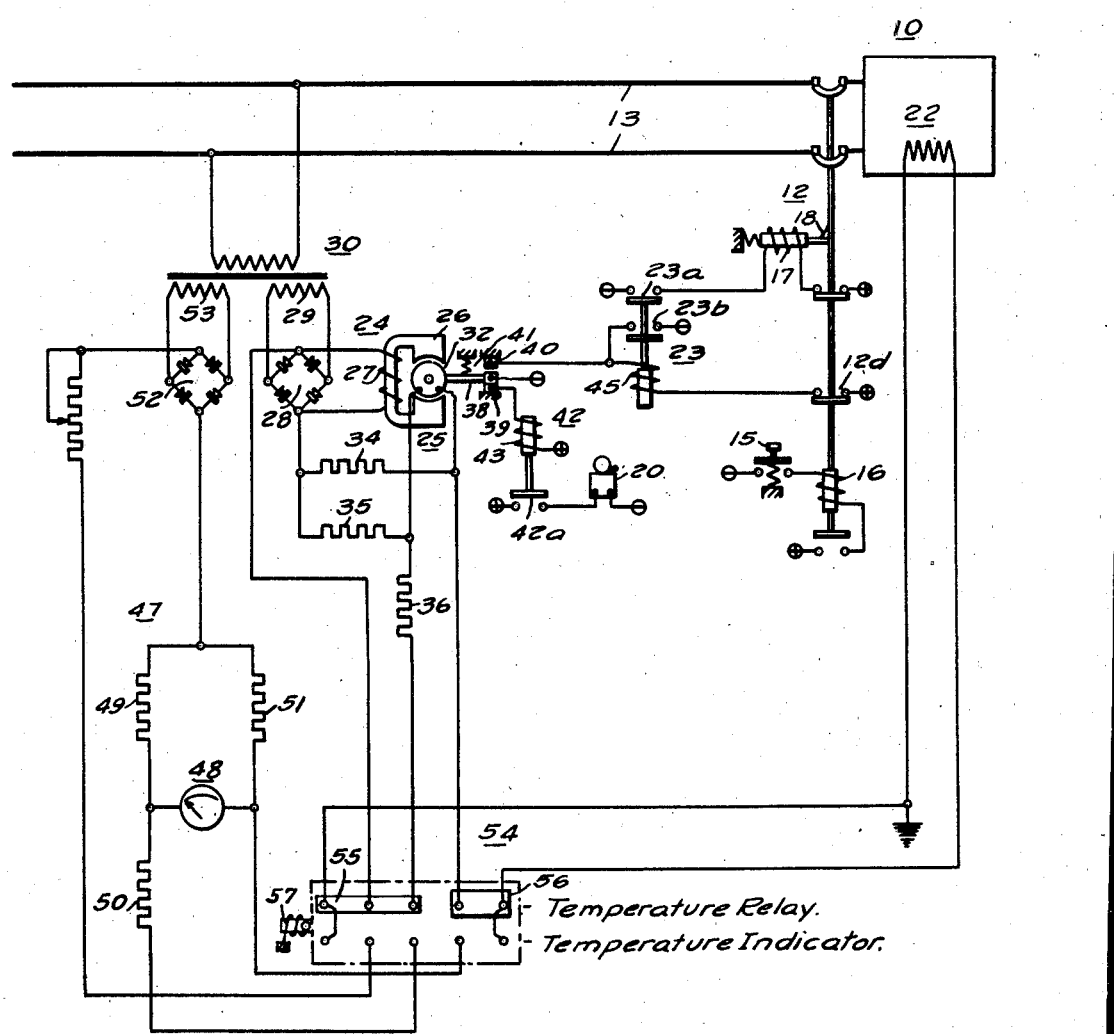
WITNESSES:                                              INVENTOR
E. A. McCloskey.                                     Wilbur C. Fulton.
F. V. Giolma                                              BY
                                                        G. D. Crawford
                                                            ATTORNEY Patented Dec. 17, 1946

2,412,881

UNITED STATES PATENT OFFICE 2,412,881

CONTROL SYSTEM

Wilbur C. Fulton, Wilkinsburg, Pa., assignor to Westinghouse Electric Corporation, East Pittsburgh, Pa., a corporation of Pennsylvania Application September 14, 1944, Serial No. 554,113

4 Claims. (Cl. 177—311)

My invention relates, generally, to control systems, and it has reference in particular to temperature indicator and temperature responsive control systems.

Generally stated, it is an object of my invention to provide a combination temperature indicator, alarm, and protective control system which is simple and inexpensive to manufacture and which is easy to operate.

More specifically, it is an object of my invention to provide for using a single temperature detector coil for operating a temperature indicator, an alarm, and performing a control function.

It is also an object of my invention to provide for selectively connecting a single temperature indicator coil to a temperature indicator, or to alarm and control circuits.

Another object of my invention is to provide for normally connecting a temperature indicator coil for sequentially operating an alarm and a control relay for deenergizing apparatus, and to provide for selectively connecting the coil to a temperature indicator device.

Yet another object of my invention is to provide for using a single temperature detector coil to perform a plurality of different functions.

A further object of my invention is to provide for sequentially performing a plurality of different functions with a single temperature detector device.

Other objects will in part be obvious, and will in part be described hereinafter.

In practicing my invention a single temperature detector coil may be used for both measuring the temperature of a piece of apparatus and performing a plurality of other functions in connection therewith. A control switch normally connects the temperature detector coil to a temperature responsive relay which effects operation of an alarm when a predetermined temperature is reached, and effects operation of a control relay when a predetermined higher temperature is reached to shut down the apparatus. The control switch may be operated to connect the detector to a temperature indicator whenever an indication of the actual temperature of the apparatus is desired.

For a more complete understanding of the nature and scope of my invention reference may be made to the following detailed description, which may be read in connection with the accompanying drawing, in which the single figure is a diagrammatic view of a control system embodying the invention in one of its forms.

Referring to the single figure of the drawing, the reference numeral 10 may denote a piece of electrically operated apparatus which may be connected by means of a circuit breaker 12 to a source of electrical energy represented by the conductors 13. Closure of the circuit breaker 12 may be effected by operating means represented by the push-button switch 15 which provides for connecting the operating winding 16 of the circuit breaker to a suitable source of control potential. The circuit breaker may be opened by means of a trip winding 17 associated with the circuit breaker latch means 18.

In order to provide an indication of the operating temperature of the apparatus 10, and operate an alarm 20 when the temperature reaches a predetermined level, as well as effect shut down of the apparatus when the temperature reaches a still higher predetermined value, means such as the temperature detector coil 22 may be provided. The coil 22 may be positioned in any suitable location on the apparatus in a manner well known in the art.

With a view to effecting operation of the alarm 20 and of a control relay 23 for deenergizing the apparatus 10, temperature responsive control means 24 may be provided. The control means may comprise a temperature responsive relay 25 having a stationary field structure 26 with a field winding 27, which may be energized from a source such as the rectifier bridge circuit 28 connected to a control winding 29 of a suitable control transformer 30 connected to the conductors 13. The relay 25 may also be provided with a movable winding 32 which may be connected in a Wheatstone bridge circuit in conjunction with control resistors 34, 35, 36, the temperature detector coil 22, and the rectifier bridge circuit 28. The movable winding 32 may be operatively connected to a movable contact arm 38 movable between stationary contact members 39 and 40. A spring 41 may be provided for normally biasing the contact arm 38 into engagement with the stationary contact member 39.

The energization of the alarm 20 may be controlled by a normally energized control relay 42 having an operating winding 43 which may be normally energized through a circuit extending through the contact arm 38 and stationary contact member 39 of the temperature responsive relay. Deenergization of the control relay 42 through the opening of contact members 38 and 39 effects energization of the alarm 20 through contact members 42a of the control relay.

As the temperature of the apparatus 10 increases the contact arm 38 continues to move in the counterclockwise direction against the spring 41. When the temperature of the apparatus 10 reaches a higher predetermined value, the moving contact arm 38 engages the upper stationary contact member 40. An energizing circuit for the control relay 23 is thereby established from the negative terminal of the source through contact arm 38, stationary contact member 40 operating winding 46 and contact members 12d of the circuit breaker for operating the control relay 23. A holding circuit for the control relay 23 is provided through contact members 23b and at the same time an energizing circuit for the trip winding 17 is provided through contact members 23a so that the circuit breaker is tripped and the apparatus 10 is disconnected from the conductors 13.

If it is desired to obtain an actual temperature indication of the apparatus 10 at any time during operation, a temperature indicator 47 may be provided. This indicator may comprise a temperature indicator device 48 disposed to be connected in a Wheatstone bridge relation with control resistors 49, 50, and 51, the temperature detector coil 22, and a source such as the rectifier bridge circuit 52 which may be energized from a winding 53 of the control transformer 30.

In order to effect a transfer from the temperature responsive relay 25 to the temperature indicator device 48, a transfer switch 54 may be provided. The transfer switch may be normally disposed to connect the moving coil 32 of the temperature responsive relay 25 in the Wheatstone bridge circuit of the temperature responsive means 24 through movable contact members 55 and 56 in one operating position, to which it may be biased by a spring 57. In the other operating position the temperature detector coil 22 may be connected to form one leg of the Wheatstone bridge circuit in which the temperature indicator device 48 is connected.

In order to prevent a false operation of the temperature responsive relay 25 when making the transfer, the moving contact member 55 may be arranged to disengage its associated stationary contact members before the moving contact member 56. In this manner the Wheatstone bridge circuit including the moving winding of the temperature responsive relay is definitely disconnected from the rectifier bridge circuit 28, and the leg of the Wheatstone bridge circuit containing the resistor 36 is opened before the temperature detector coil is disconnected from the Wheatstone bridge circuit. Any tendency of the temperature responsive relay to operate and give a false indication of increased temperature because of opening the leg of the Wheatstone bridge circuit in which the coil 22 is connected is thereby prevented.

From the above description and the accompanying drawing it will be apparent that I have provided a simple and inexpensive control circuit for obtaining a plurality of operating functions in conjunction with a single temperature detector coil. The apparatus involved is simple and inexpensive to manufacture and provides a reliable and economical temperature indicator as well as protective control system for protecting apparatus against damage due to excessive temperatures.

Since certain changes may be made in the above described construction and different embodiments of the invention may be made without departing from the spirit and scope thereof, it is intended that all of the matter contained in the above description and shown in the accompanying drawing shall be considered as illustrative and not in a limiting sense.

I claim as my invention:

1. A temperature responsive control system for use with apparatus comprising, a temperature detector coil associated with the apparatus, a temperature responsive relay having an operating winding connected for energization in accordance with the temperature of the detector coil and provided with normally closed contact means and normally open contact means actuable in sequence in accordance with the energization of said winding, alarm means operable under the control of the normally closed contact means of the temperature responsive relay when the apparatus reaches a predetermined operating temperature, and relay means operable under the control of the normally open contact means of the temperature responsive relay when the apparatus reaches a higher predetermined operating temperature to render the apparatus inoperative.

2. The combination with a single temperature detector coil, of a bridge circuit including a temperature responsive relay, a bridge indicating circuit including a temperature indicator device, and a control switch operable to connect the detector coil in one leg of either the temperature responsive relay or the temperature indicator device bridge circuit, said control switch having means for biasing it to normally connect the detector coil in the temperature responsive relay bridge circuit.

3. In a control system for electrically operated apparatus, a temperature detector coil associated with the apparatus and electrically disconnected from its main circuit, a temperature relay having a moving coil connected to the detector coil and having normally closed contacts which open when the apparatus reaches a predetermined temperature and normally open contacts which close when the apparatus reaches a predetermined higher temperature, alarm means, control means including a relay normally energized through the normally closed contacts of the temperature relay and operable when deenergized to energize the alarm means, switch means controlling the energization of the apparatus, and additional control means disposed to be energized through the normally open contacts of the temperature relay for effecting operation of the switch means.

4. For use with a single temperature detector coil associated with a piece of apparatus, a temperature indicator, a thermal relay having a movable contact arm and a moving coil for actuating the movable contact arm to different operating positions, means for applying direct current potentials to the detector coil and the thermal relay moving coil or temperature indicator selectively including switch means having normally closed contact members and normally open contact members, circuit means including the normally closed contact members connecting the detector coil and the moving coil in a Wheatstone bridge circuit with one of said direct current control potentials, additional circuit means including the normally open contact members operable to connect the detector coil and the temperature indicator in a Wheatstone bridge circuit with another of the substantially constant control potentials, the normally closed contact members being arranged to disconnect the Wheatstone bridge circuit from the source before disconnecting the detector coil therefrom, so as to prevent false operations of the relay.

WILBUR C. FULTON.